United States Patent
Ramsay et al.

(10) Patent No.: US 11,598,893 B2
(45) Date of Patent: Mar. 7, 2023

(54) SEISMIC ROCK PROPERTY PREDICTION IN FORWARD TIME BASED ON 4D SEISMIC ANALYSIS

(71) Applicant: Landmark Graphics Corporation, Houston, TX (US)

(72) Inventors: Travis St. George Ramsay, Hockley, TX (US); Jesse M. Lomask, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 272 days.

(21) Appl. No.: 16/769,067

(22) PCT Filed: Jan. 10, 2018

(86) PCT No.: PCT/US2018/013187
§ 371 (c)(1),
(2) Date: Jun. 2, 2020

(87) PCT Pub. No.: WO2019/139578
PCT Pub. Date: Jul. 18, 2019

(65) Prior Publication Data
US 2020/0341162 A1  Oct. 29, 2020

(51) Int. Cl.
*G01V 1/30* (2006.01)
*E21B 49/00* (2006.01)
*G01V 1/28* (2006.01)

(52) U.S. Cl.
CPC .............. *G01V 1/308* (2013.01); *E21B 49/00* (2013.01); *G01V 1/282* (2013.01); *G01V 1/306* (2013.01); *E21B 2200/20* (2020.05)

(58) Field of Classification Search
CPC ........ G01V 1/308; G01V 1/282; G01V 1/306; G01V 2210/612; G01V 2210/6122; G01V 1/50; E21B 49/00; E21B 2200/20
See application file for complete search history.

(56) References Cited

U.S. PATENT DOCUMENTS 5,737,219 A    4/1998  Vartanyan
6,498,989 B1 * 12/2002  Pisetski ............... G01V 1/288
                                                      702/14

(Continued)

FOREIGN PATENT DOCUMENTS

| EP | 3121625 A1 * | 1/2017 | ............. G01V 1/284 |
| GB | 2476519 A | 6/2011 | |
| WO | WO 2005/114258 A1 | 12/2005 | |
| WO | WO 2017/105885 A1 | 6/2017 | |
| WO | WO 2017/202637 A1 | 11/2017 | |

OTHER PUBLICATIONS

Examination Report issued for United Kingdom Patent Application No. GB2008110.5, dated Jan. 20, 2022, 4 pages.

(Continued)

*Primary Examiner* — Manuel A Rivera Vargas
*Assistant Examiner* — Yaritza H Perez Bermudez
(74) *Attorney, Agent, or Firm* — Benjamin Ford; Parker Justiss, P.C.

(57) ABSTRACT

System and methods for predicting time-dependent rock properties are provided. Seismic data for a subsurface formation is acquired over a plurality of time intervals. A value of at least one rock property of the subsurface formation is calculated for each of the plurality of time intervals, based on the corresponding seismic data acquired for that time interval. At least one of a trend or a spatio-temporal relationship in the seismic data is determined based on the value of the at least one rock property calculated for each time interval. A value of the at least one rock property is estimated for a future time interval, based on the determination. The estimated value of the at least one rock property is used to select a location for a wellbore to be drilled within the subsurface formation. The wellbore is then drilled at the selected location.

20 Claims, 8 Drawing Sheets

(56) References Cited

U.S. PATENT DOCUMENTS

| | | | | |
|---|---|---|---|---|
| 7,277,797 | B1* | 10/2007 | Kunitsyn | G01V 1/008 |
| | | | | 702/15 |
| 9,310,502 | B2* | 4/2016 | Ozdemir | G01V 1/28 |
| 10,607,043 | B2* | 3/2020 | Camargo | E21B 43/26 |
| 2001/0005813 | A1 | 6/2001 | Chambers et al. | |
| 2006/0219402 | A1 | 10/2006 | Lecampion | |
| 2010/0042325 | A1* | 2/2010 | Beasley | G01V 1/306 |
| | | | | 702/11 |
| 2010/0155142 | A1* | 6/2010 | Thambynayagam | E21B 44/00 |
| | | | | 175/61 |
| 2011/0188346 | A1 | 8/2011 | Hull | |
| 2011/0272147 | A1* | 11/2011 | Beasley | E21B 43/26 |
| | | | | 166/250.1 |
| 2018/0217281 | A1* | 8/2018 | Basler-Reeder | G01V 1/282 |
| 2019/0219734 | A1* | 7/2019 | Solans | G01V 11/00 |
| 2020/0184374 | A1* | 6/2020 | Liu | G06N 20/00 |
| 2022/0091290 | A1* | 3/2022 | Zhang | G06N 20/00 |
| 2022/0091291 | A1* | 3/2022 | Zhang | G01V 1/282 |
| 2022/0091300 | A1* | 3/2022 | Zhang | G01V 99/005 |

OTHER PUBLICATIONS

Gething et al., "A Local Space-Time Kriging Approach Applied to a National Outpatient Malaria Data Set," *Computers & Geosciences*, vol. 33, No. 10-5, Oct. 2007, pp. 1337-1350.

GP211—Image Estimation by Example, Stanford Exploration Project, http://sepwww.stanford.edu/doku.php?id=sep:courses:gp211.

Hale, "Dynamic Warping of Seismic Images," *Geophysics*, vol. 78, No. 2, Mar.-Apr. 2013, pp. S105-S115.

Heuvelink et al., "Space-Time Geostatistics for Geography: A Case Study of Radiation Monitoring Across Parts of Germany," *Geogaphical Analysis*, vol. 42, 2010, pp. 161-179.

International Search Report and Written Opinion issued for International Patent Application No. PCT/US2018/013187, dated Sep. 28, 2018, 15 pages.

Claerbout, "Image Estimation by Example: Geophysical Soundings Image Construction (GEE)," http://sepwww.stanford.edu/data/media/public/sep/prof/gee/toc_html/.

\* cited by examiner

SEISMIC ROCK PROPERTY PREDICTION IN FORWARD TIME BASED ON 4D SEISMIC ANALYSIS

CROSS-REFERENCE TO RELATED APPLICATION

The present application is a U.S. National Stage patent application of International Patent Application No. PCT/US2018/013187, filed on Jan. 10, 2018, the benefit of which is claimed and the disclosure of which is incorporated herein by reference in its entirety.

FIELD OF THE DISCLOSURE

The present disclosure relates generally to seismic analysis of subsurface rock formations, and particularly, to seismic analysis techniques for modeling time-dependent properties of subsurface rock formations.

BACKGROUND

In hydrocarbon exploration and production, seismic imaging techniques may be used to gain an understanding of the depth and structures of subsurface geological formations. Various seismic sources, such as dynamite, "thumper" trucks, air guns, and other noise sources located at the surface of a hydrocarbon bearing formation, may be used to propagate waves of seismic energy through an underground formation. The propagated waves are reflected through the formation and acquired using various seismic signal receiver devices, for example, geophones, hydrophones, and the like. A record of the seismic wave reflections acquired from the underground formation at different points in time may then be used to estimate the rock properties of different formation areas that may be of interest for hydrocarbon exploration and/or production. For example, seismic data can be used to generate three-dimensional (3D) models of subsurface geological structures, including faults and other stratigraphic features that may trap hydrocarbon and mineral deposits, within an area of interest. Such 3D models may be used to simulate the flow of fluids within the subsurface formation. The results of such a simulation may then be used for performing various activities related to hydrocarbon production and economic evaluation including, but not limited to, predicting future production, placing additional wells, and evaluating alternative reservoir management scenarios.

Various seismic modeling and simulation techniques may be used for enabling the quantitative integration of field data into an updateable reservoir model. Such techniques may include, for example, integrated petrophysics and rock physics to determine the range of lithotypes and rock properties, geostatistical inversion to determine a set of plausible seismic-derived rock property models at sufficient vertical resolution and heterogeneity for flow simulation, stratigraphic grid transfer to accurately move seismic-derived data to the geologic model, and flow simulation for model validation and ranking to determine the model that best fits all the data. The seismic simulation performed using such techniques may be considered successful if the underlying model accurately reflects the original well logs, seismic data and production history. However, the integration of seismic data from the field into a model as part of a simulation workflow is not always successful as the seismic data may be inaccurate, incomplete, or unavailable altogether.

DESCRIPTION OF ILLUSTRATIVE EMBODIMENTS

Figure 1:
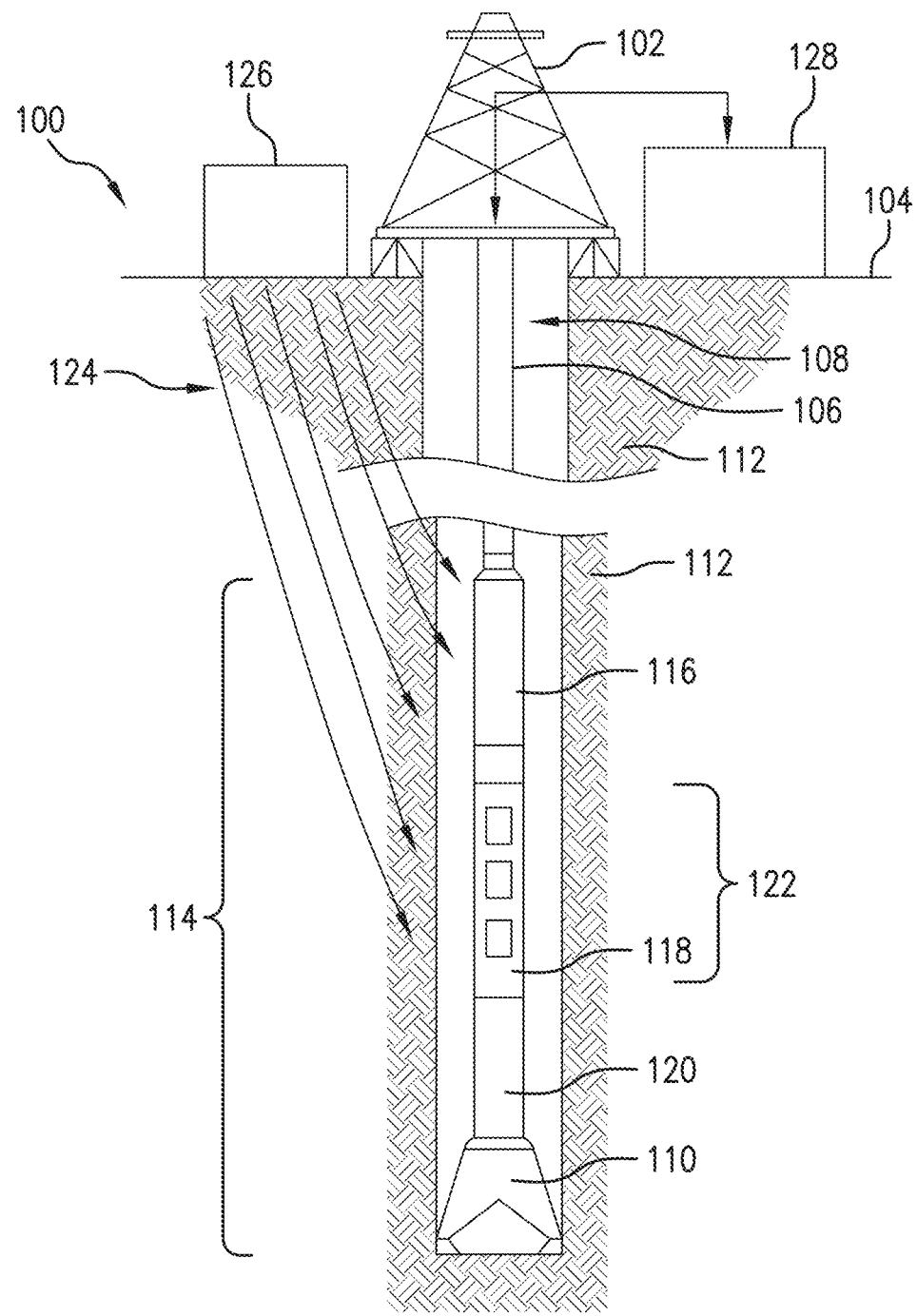
FIG. 1 is a cross-sectional schematic diagram of a wellbore environment for acquiring seismic data from a land-based seismic survey of a subsurface formation.

Embodiments of the present disclosure relate to seismic analysis and modeling of time-dependent rock properties of a subsurface formation in forward time. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Although embodiments of the present disclosure may be described in the context of a horizontal wellbore or a vertical wellbore, unless indicated otherwise, it should be appreciated that the disclosed embodiments are equally well suited for use in wellbores having other orientations including vertical wellbores, slanted wellbores, multilateral wellbores or the like. Likewise, unless otherwise noted, even though embodiments may be described in the context of an offshore operation, it should be appreciated that the apparatus according to the present disclosure is equally well suited for use in onshore operations and vice-versa. Further, unless otherwise noted, even though embodiments may be described in the context of a cased hole, it should be appreciated that the apparatus according to the present disclosure is equally well suited for use in open hole operations.

As will be described in further detail below, embodiments of the present disclosure may be used to analyze and estimate time-dependent rock properties of a subsurface formation. In one or more embodiments, seismic inversion datasets representing time-dependent rock properties of the formation may be acquired over a plurality of time intervals. For example, such data may include seismic measurements acquired on a periodic basis at different points in time so as to create a time-lapse view of one or more of the formation's rock properties. Such time-lapse data may be referred to as "4D" seismic data, where time is viewed as a fourth dimension in the acquisition, processing and analysis of repeated seismic surveys to assess changes in the formation's rock properties over time. Examples of such rock properties include, but are not limited to, impedance, Poisson's Ratio, ratio of compressional to shear velocity (Vp/Vs), porosity, permeability, fluid saturation, pressure, and other geomechanical or geophysical properties of the formation.

In one or more embodiments, the acquired time-lapse datasets may be used to estimate or predict the time-dependent rock properties of the formation at some future point in time. For example, an analysis of the acquired datasets may be used to determine existing data trends, which can be used to produce estimated seismic property arrays in future time and/or multiple equiprobable realizations of one or more inverted seismic rock properties at an instance in time for which the seismic measurements are missing or have yet to be acquired. The estimated time-dependent rock properties may then be quantitatively co-analyzed and qualitatively co-visualized with results from a flow simulation in order to assess how time-dependent rock properties can vary with time as a result of fluid displacements and elastic rock property changes. The estimated properties may also be used to predict changes in time-dependent rock properties that are derived from time-based petro-elastic modeling, which in turn may be derived from a simulation of fluid flow in the porous media of the formation. The calculation and analysis of the estimated rock property data may be performed for any future scenario when at least two inverted seismic vintages or surveys exist. However, it should be appreciated that the estimates of seismic rock properties in forward time may be better constrained with substantially more time-lapse survey data, e.g., when the number of inverted time-lapse seismic surveys is far greater than two.

Illustrative embodiments and related methodologies of the present disclosure are described below in reference to FIGS. 1-8 as they might be employed, for example, in a computer system for seismic analysis and modeling of time-dependent rock properties of a subsurface formation. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a cross-sectional schematic diagram of a wellbore environment 100 for acquiring seismic data from a land-based seismic survey of a subsurface formation. The wellbore environment 100 includes a derrick 102 positioned at a surface 104 of the formation. The derrick 102 may support a drill string 106 and other components of the wellbore environment 100. The drill string 106 may include segmented pipes that extend below the surface 104 in a wellbore 108. The drill string 106 may transmit drilling fluid (or drilling mud) necessary to operate a drill bit 110 positioned at the end of the drill string 106. The mud transmitted by the drill string 106 may provide the torque necessary to operate the drill bit 110. The weight of the drill string 106 may provide an axial force on the drill bit 110 that, together with the rotation of the drill bit 110, may aid in drilling the wellbore 108 from the surface 104 through various formation layers 112.

The drill string 106 includes a bottom hole assembly 114 positioned on the drill string 106 near the drill bit 110. The bottom hole assembly 114 includes a combination of various components including, but not limited to, one or more drill collars 116, a seismic tool 118, and a downhole motor assembly 120 housing a motor for the drill bit 110. The seismic tool 118 may include a number of measurement devices for measuring various properties of the formation and other data related to the downhole operation that may be in progress. Such measurement devices may include, for example, an array of seismic sensors 122, e.g., geophones or other types of downhole seismic measurement devices, for detecting and recording seismic energy downhole.

The seismic energy may be generated by a seismic source 126 located at the surface 104 of the formation. The seismic source 126 may be any of various seismic energy sources that may be used to conduct a seismic survey of the formation. Examples of such seismic sources include, but are not limited to, an air gun, a plasma sound source, a weight-drop truck, one or more explosive devices, an electromagnetic pulse ("EMP") energy source, and a seismic vibrator. As shown in FIG. 1, the seismic survey in this example may be conducted by propagating seismic energy in the form of seismic waves 124 from the seismic source 126 through the formation layers 112 surrounding the wellbore 108. Some of the seismic waves 124 generated by the seismic source 126 may be reflected or refracted by the formation layers 112 and then sampled by the seismic sensors 122 of the seismic tool 118 within the downhole assembly 114.

The sampled seismic data may then be transferred to a data acquisition unit 128 located at the surface 104, e.g., via a wired or wireless connection between the data acquisition unit 128 and the seismic tool 118 (or a telemetry device thereof). The seismic data received by the data acquisition unit 128 from the seismic tool 118 may be stored within an internal storage device of the data acquisition unit 128. In some implementations, the seismic tool 118 may also include an internal memory or storage device in which the sampled seismic data may be stored downhole before being transmitted to the data acquisition unit 128. It should be appreciated that the data acquisition unit 128 may be implemented using any type of computing device having at least one processor and a memory. Such a computing device may also include a communications infrastructure capable of receiving and transmitting data over a network as well as an input/output interface for receiving input from a user (e.g., via a mouse, QWERTY keyboard, touch-screen, a graphics tablet, or microphone) and presenting information to the user, e.g., via a display or other output device. Such a computing device can be, for example and without limitation, a mobile phone, a personal digital assistant (PDA), a tablet computer, a laptop computer, a desktop computer, a workstation, a server, a server cluster or other similar type of device capable of processing instructions and receiving and transmitting data to and from humans and other computing devices.

In one or more embodiments, the seismic sensors 122 may sample the seismic waves 124 downhole at predetermined intervals of time. Additionally or alternatively, the seismic source 126 may generate and transmit the seismic waves 124 from the surface 104 at predetermined intervals. Accordingly, the seismic data transmitted to the surface 104 may be acquired by the data acquisition unit 128 on a periodic basis, e.g., once every month, once every three months, once every six months, once a year, etc. In some implementations, such time-lapsed seismic data as acquired by the data acquisition unit 128 may be stored locally and processed for purposes of analyzing and estimating time-dependent rock properties of a subsurface formation, as will be described in further detail below. Alternatively, the seismic data acquired by the data acquisition unit 128 may be transmitted via a communication network to a remote computing device, e.g., computing device 306 of FIG. 3, as will be described in further detail below. The remote computing device may be used to implement the seismic analysis and time-dependent rock property estimation techniques disclosed herein. In some implementations, the data acquisition unit 128 may transfer the seismic data via the network to a remote database (not shown) for storage. The database may also be accessible to the remote computing device for retrieving the stored seismic data via the network.

While only data acquisition unit 128 is shown in FIG. 1, it should be appreciated that the wellbore environment 100 may include any number of such units or data processing devices for acquiring and processing information from the seismic tool 118. Also, while only seismic source 126 is shown, it should be appreciated that any number of seismic sources may be used as desired for a particular implementation.

Figure 2:
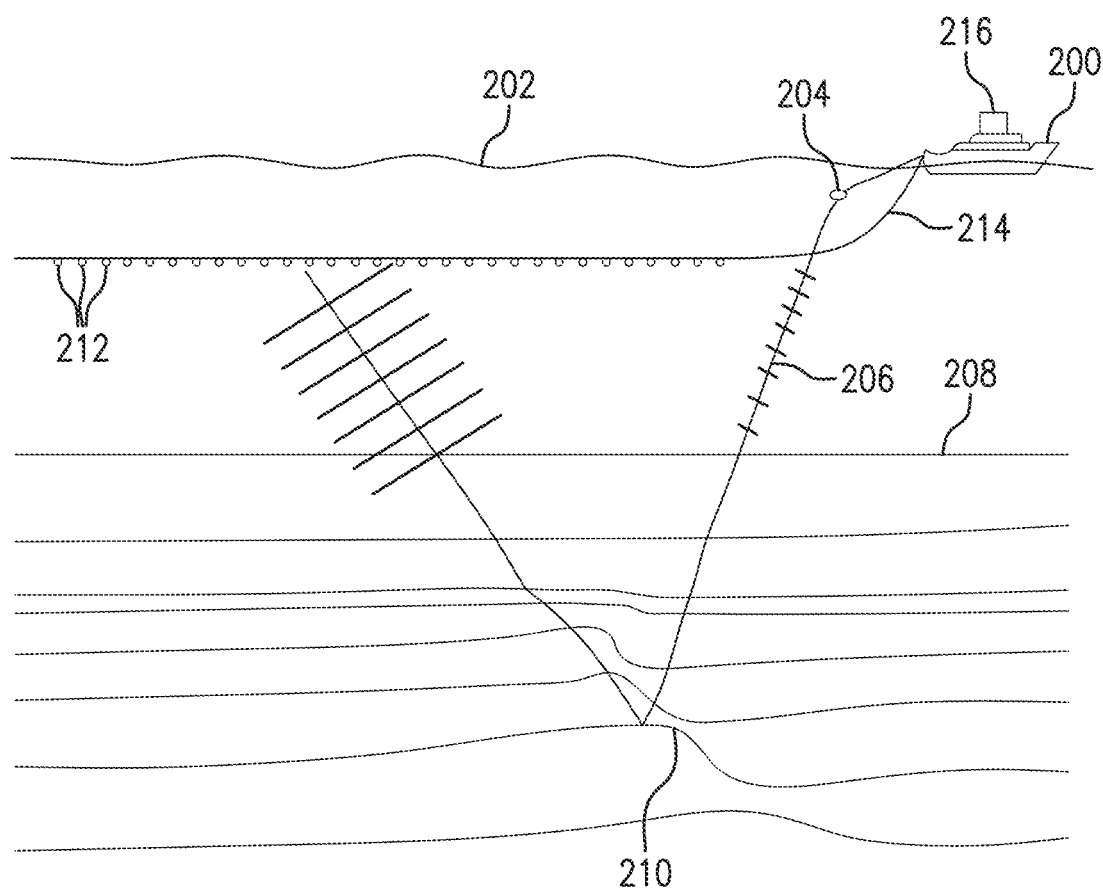
FIG. 2. is a cross-sectional schematic diagram of a marine environment for acquiring seismic data from a marine-based seismic survey of a subsurface formation.

FIG. 2. is a cross-sectional schematic diagram of a marine environment for acquiring seismic data from a marine-based seismic survey of a subsurface formation. As shown in FIG. 2, a seismic vessel 200 is positioned on a surface 202 of the ocean. The seismic vessel 200 may tow one or more seismic sources 204, such as an impulse source or a vibratory source. The seismic sources 204 may transmit seismic waves 206 through the ocean floor 208. The seismic waves 206 may be reflected or refracted off subterranean formations 210 below the ocean floor 208 and received by an array of seismic sensors 212, such as hydrophones, trailing behind the seismic vessel 200 on one or more streamers 214. In some aspects, the streamers 214 may include electrical or fiber-optical cabling for connecting the array of sensors 212 to seismic equipment on the seismic vessel 200, including a data acquisition unit 216. The sensors 212 may measure the reflections of the seismic waves 124 and transmit the measurements through the streamers 214 for storage in the data acquisition unit 216.

Figure 3:
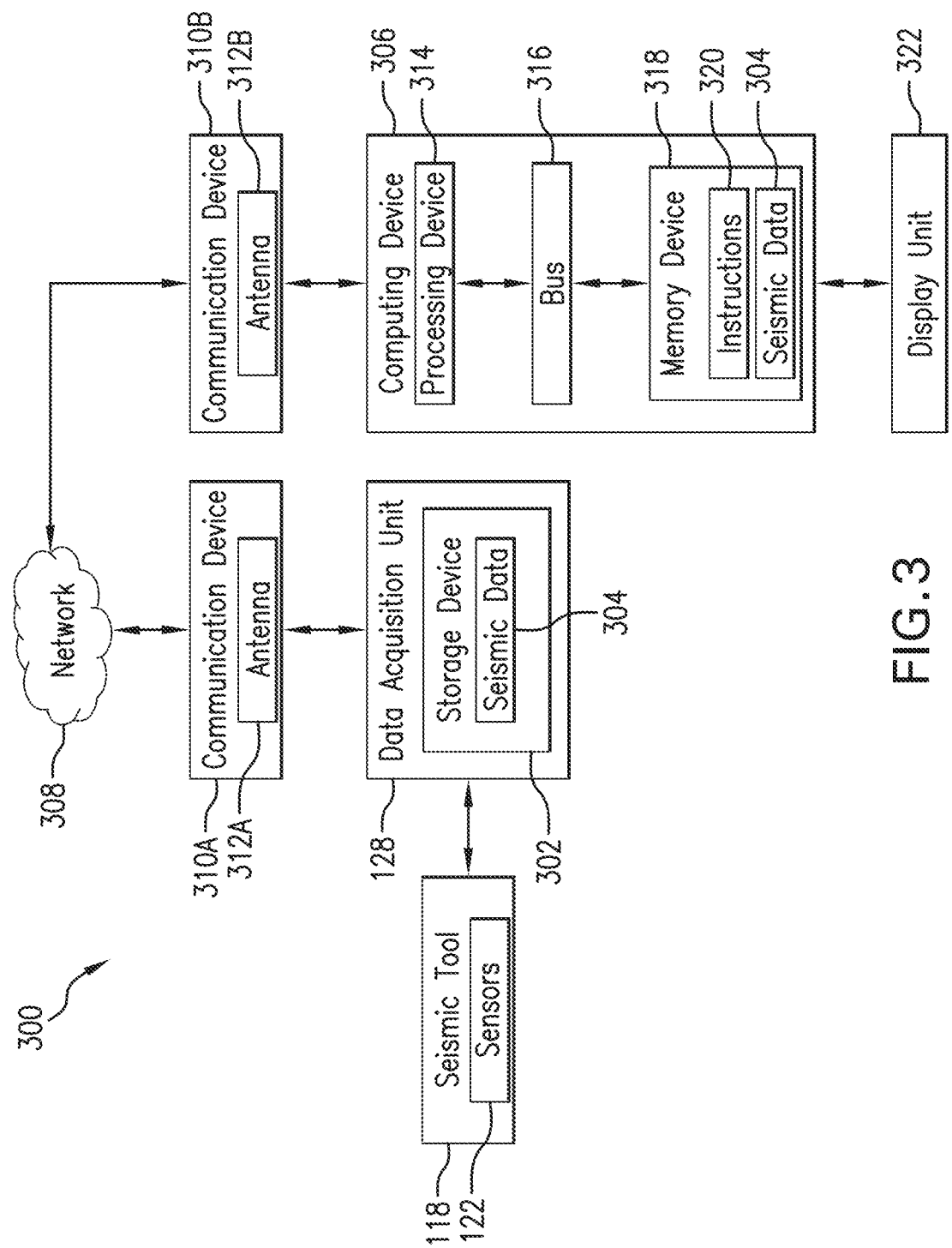
FIG. 3 is a block diagram of a system for seismic analysis and modeling of a time-dependent rock property of a subsurface formation in forward time.

FIG. 3 is a block diagram of a system 300 for seismic analysis and estimation of time-dependent rock properties of a subsurface formation. For purposes of discussion and explanation, the system 300 will be described with reference to components of the wellbore environment 100 of FIG. 1, as described above. For example, the system 300 as shown in FIG. 3 includes the data acquisition unit 128 of FIG. 1. However, it should be noted that embodiments of the present disclosure are not intended to be limited thereto and that the system 300 may be adapted to include other components as desired for a particular implementation. For example, the system 300 may include the data acquisition unit 216 and a seismic tool including the array of seismic sensors 212 of FIG. 2 for implementing the seismic analysis and estimation techniques disclosed herein within a marine-based wellbore environment.

As described above, the data acquisition unit 128 may be communicatively coupled to the seismic tool 118 of FIG. 1 via a wired or wireless connection. The seismic tool 118 may include one or more of the seismic sensors 122 for detecting and sampling waves of seismic energy generated by a seismic source (e.g., the seismic source 126 of FIG. 1) and reflected or refracted off subterranean formation layers adjacent to a wellbore (e.g., formation layers 112 adjacent to the wellbore 108 of FIG. 1). The sampled seismic information may be transmitted by the seismic tool 118 over the wired or wireless connection to the data acquisition unit 128 at the surface. The data acquisition unit 128 may store the seismic information that it receives from the seismic tool 118 within a storage device 302 as seismic data 304. The storage device 302 may be any type of recording medium coupled to an integrated circuit that controls access to the recording medium. The recording medium can be, for example and without limitation, a semiconductor memory, a hard disk, or other similar type of memory or storage device.

In one or more embodiments, the seismic data 304 may be transmitted from the data acquisition unit 128 to a computing device 306 via a network 308. Network 308 may be any type of network or combination of networks used to communicate information between different computing devices. Network 308 can include, but is not limited to, a wired (e.g., Ethernet) or a wireless (e.g., Wi-Fi and 3G) network. In addition, network 308 can include, but is not limited to, a local area network, medium area network, and/or wide area network such as the Internet. The data acquisition unit 128 and the computing device 306 may be coupled to, or include, respective communication devices 310A, 310B. The communication devices 310A and 310B include or are coupled to antennae 312A and 312B, respectively, for transmitting and receiving information via the network 308. However, it should be appreciated that the disclosed embodiments are not limited thereto and that any suitable means may be employed for transmitting information between the data acquisition unit 128 and the computing device 306. In one or more embodiments, the seismic data 304 may include raw information from the sensors 122 of the seismic tool 118, which may need to be appropriately processed and formatted by the data acquisition unit 128 prior to transmitting the seismic data 304 to the computing device 306.

The computing device 306 may include a processing device 314, a bus 316, and a memory device 318. The processing device 314 may execute a plurality of functions or operations for estimating a value of at least one time-dependent rock property of the subsurface formation at some future point in time based on the seismic data 304 received from the data acquisition unit 128 and stored within the memory device 318. The processing device 314 may perform such functions or operations as a result of executing instructions 320 stored in the memory device 318. The processing device 314 may be a processor and the memory device 318 may be any type of processor-readable storage medium including, but not limited to, a semiconductor memory, a hard disk, or other similar type of memory or storage device. The instructions 320 may include processor-specific instructions generated by a compiler or an interpreter from code written in any suitable computer-programming language. The instructions 320 may include instructions executable by the processing device 314 for performing various operations relating to the seismic analysis and modeling techniques disclosed herein. Such operations may include, for example, operations for estimating a value of the time-dependent rock property at a future instance or interval of time based on various approximation schemes that take into account one or more observed values of the rock property from a previous time interval, as will be described in further detail below.

In one or more embodiments, the aforementioned time-dependent rock property estimation functions performed by the processing device 314 may include functions to analyze the seismic data 304 and determine existing data trends. A visualization of such data trends, e.g., in the form of a line graph or other type of graphical visualization, may also be displayed for a user via a display unit 322. As described above, the seismic data 304 may include measurements of reflected and refracted seismic waves as acquired by the seismic tool 118 and data acquisition unit 128 over a series of time intervals. Such measurements may be acquired as part of a two-dimensional (2D) or three-dimensional (3D) seismic survey of the formation that is periodically conducted at different points in time, thereby producing a number of vintages of seismic data.

In one or more embodiments, the estimation of time-dependent rock property values may be performed for a future time interval based on the seismic measurements acquired for at least two preceding time intervals, i.e., when at least two seismic vintages are available. An example of the seismic measurements acquired for a time-dependent rock property of a formation is shown in the following table:

| $i^{th}$ Measurement | Time Interval for Time-Dependent |
|---|---|
| 0 | $t_0$ |
| 1 | $t_1$ |
| 2 | $t_2$ |
| ... | ... |
| Q | $t_Q$ |

As shown in the table above, seismic measurements of the time-dependent rock property may be acquired over a plurality of time intervals $t_i$, $t_{i+1}$, $t_{i+2}$, ... $t_Q$, where an index "i" represents a basis of time for measurements of the rock property at each interval and the value of i is an integer between 0 and some number Q. The state of the time-dependent rock property at a given time "t" may be a function of the rate at which seismic surveys of the formation are conducted and seismic measurements from the surveys are acquired. The seismic acquisition rate in this example may be based on the size or duration of each time interval $t_i$, e.g., as measured in days, months, years, etc.

In one or more embodiments, seismic surveys of the subsurface formation may be conducted over a plurality of time intervals to monitor changes in one or more time-dependent rock properties of the formation. Such changes may be due to, for example, the removal of oil and/or gas from the formation during hydrocarbon production operations. As will be described in further detail below, the seismic vintages or time-lapse datasets obtained from the repeated seismic surveys may be quantitatively and qualitatively analyzed using one or more approximation schemes to assess how time-dependent rock properties can vary with time as a result of fluid displacements and elastic rock property changes within the formation. An example of the changes that may occur for a rock property of a subsurface formation over time and space is shown in FIGS. 4A-4C.

Figure 4A:
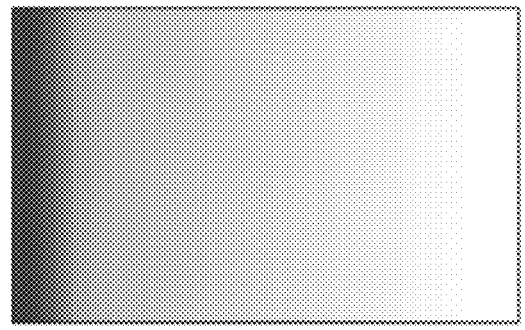
FIGS. 4A-4C are diagrams of an illustrative profile of a time-dependent rock property as it transitions over successive time intervals.
Figure 4B:
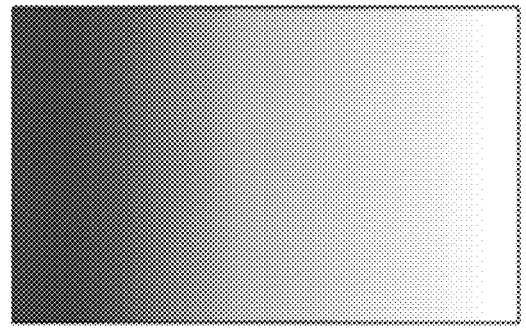
Figure 4C:
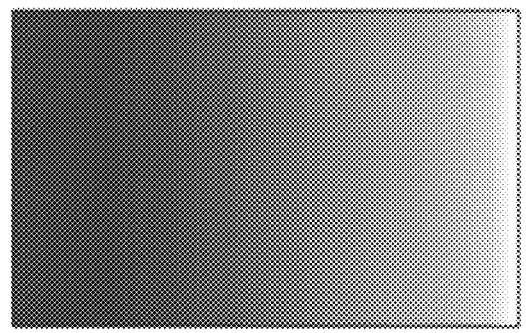

FIGS. 4A, 4B and 4C show different instances or states of an illustrative profile of a time-dependent rock property over successive time intervals $t_0$, $t_1$ and $t_2$, respectively. The time-dependent rock property may be, for example and without limitation, the impedance of the rock within an area of the formation, e.g., a formation area or zone that has been targeted for hydrocarbon exploration and/or production. The profile of the rock property at each time interval may be an image of the time-dependent rock property in the form of a 2D spatially variable map of the rock property. Such a map may represent, for example, a spatial distribution of the time-dependent rock property within a 2D seismic area of the subsurface formation. However, it should be appreciated that the disclosed techniques are not limited thereto and that these techniques may also be applied to 3D seismic volumes and datasets.

As shown in FIGS. 4A-4C, the time-dependent impedance property of the rock varies from higher values to lower values as the distribution of the time-dependent rock (shaded area) increases from the left-hand portion of the map to the right-hand portion over time. The increase may be due to a higher percentage of the time-dependent rock being displaced, e.g., as more hydrocarbons are produced from the formation from one time interval to the next.

In one or more embodiments, time-dependent rock property profiles for future time intervals or time instances past the current or indicated present time may be estimated based on the measured or calculated time-dependent rock properties from current and previous time intervals. As described above, values of one or more time-dependent rock properties may be calculated based on seismic data acquired for a targeted area of the formation at each of a plurality of time intervals. The calculation may include performing an inversion of the acquired seismic data to generate one or more seismic inversion datasets representing the rock properties over the plurality of time intervals and calculating the rock property values based on the generated seismic inversion datasets.

In one or more embodiments, the calculated values may be analyzed to determine trends in the existing data over the plurality of time intervals. The analysis may involve, for example, using the seismic inversion datasets to simulate fluid flow within the subsurface rock property media over the plurality of time intervals. The results of the simulation may then be used to generate a petro-elastic model of the subsurface formation for predicting the time-dependent rock properties at a future time interval, e.g., along a forward time series. In one or more embodiments, the petro-elastic model may be defined by a 2D or 3D stratigraphic grid of cells in which the formation's rock properties may be distributed. For example, a vertical thickness of each cell in the grid may represent values of the rock property in the time domain and a horizontal width of each cell in the grid may represent values of the rock property in a spatial domain.

For purposes of continuity between space and time, one or more numerical modeling techniques may be used to perform the flow simulations such that a physical domain of dependence exists within the numerical domain of dependence. This may provide synergy between the inverted seismic datasets and a numerical model used for the flow simulation. This may also allow the numerical simulation fluid flow within the targeted formation area to be co-analyzed and calibrated with the acquired seismic data over the same time intervals. To ensure the above dependency condition between the physical and numerical domains is honored, the accuracy of the forward time series prediction may be verified using Equation (1):

$$\sum \left| \frac{u \Delta t}{\Delta x_i} \right| \leq 1, \qquad (1)$$

where $\Delta t$ is an elapsed time between sampling intervals and may serve as a time increment for the numerical model in the flow simulation, $\Delta x$ is a change in distance or spatial location of the formation properties associated with the samples of seismic data, and u corresponds to the velocity of the saturated rock property flow front sampled by a seismic tool, e.g., seismic tool 118 of FIGS. 1 and 3, as described above.

In one or more embodiments, the numerical modeling technique for predicting values of a time-dependent rock property at a future instance of time may be based on one or more extrapolation schemes. Such a scheme may be used to extrapolate a continuous rock property (F) as a function of time (t), e.g., as expressed by Equation (2):

$$F(t_{i+1}) = F(t_{i-1}) + \frac{t_{i+1} - t_{i-1}}{t_i - t_{i-1}} (F(t_i) - F(t_{i-1})), \qquad (2)$$

where $F(t_{i+1})$ is a value of the rock property at a future or predicted time instance, $F(t_{i-1})$ is the value of the rock property at a preceding instance of time, and $F(t_i)$ is the value of the rock property at the current time. The current and previous values of the rock property may be based on seismic data acquired or sampled from seismic surveys performed during corresponding time intervals, i.e., $t_i$ and $t_{i-1}$, respectively. According to Equation (2), the future value of the rock property is a linear extrapolation of the preceding and current rock property values. As a result, the future value of the rock property, i.e., $F(t_{i+1})$, may only be an approximation of the time-dependent rock property at a predicted instance of time, as illustrated in FIG. 5.

Figure 5:
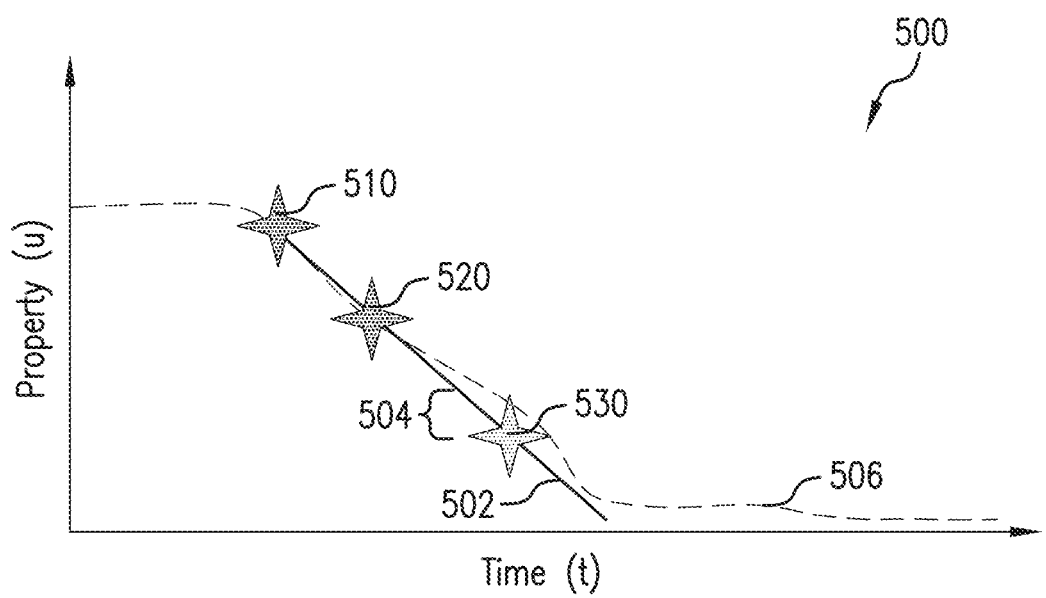
FIG. 5 is a graph of an illustrative profile for a time-dependent rock property at a fixed location within a subsurface formation.

FIG. 5 is a graph 500 of values for a time-dependent rock property at a fixed location over time. As shown in FIG. 5, the graph 500 includes a solid line representing a profile 502 of the rock property based on extrapolated values of the rock property, e.g., according to the linear extrapolation scheme using Equation (2), as described above. However, it should be appreciated that embodiments of the present disclosure are not limited thereto and that other extrapolation schemes, e.g., polynomial extrapolation or variants thereof, may be used instead. The graph 500 also includes a dashed line representing a profile 506 of the rock property based on measurements of the actual rock property values over time.

A point 510 within the graph 500 may represent $F(t_{i-1})$ or a previous value of the rock property, e.g., based on seismic data acquired during a previous time interval. A point 520 may represent $F(t_i)$ or a current value of the rock property value, e.g., based on additional seismic data acquired during a current time interval. A point 530 along the profile 502 may represent an approximation of $F(t_{i+1})$ or the value of the rock property at a future instance of time. In one or more embodiments, the approximated value of the time-dependent rock property at point 530 may be a linear extrapolation of $F(t_{i-1})$ and $F(t_i)$ based on a trend in the rock property values between the points 510 and 520. The trend in this example may be based on, for example, a rate of change in the rock property values along the profile 502. The rate of change may be determined by computing a slope of the line representing the profile 502 in graph 500.

A gap 504 between profiles 502 and 506 in the graph 500 may represent an error (E) between the approximation and the actual value of the time-dependent rock property. The size of the gap 504 and the associated error in approximating the value of the time-dependent rock property at point 530 may depend on the frequency at which the seismic data is acquired and changes in the value of the rock property are observed. For example, the error may be reduced by increasing the acquisition rate of seismic data such that changes in the rock property value can be observed at a sufficiently high frequency and an overly exaggerated approximation of the rock property value based on the changes in the value between successive time intervals (e.g., between points 510 and 520) can be avoided.

The linear approximation of the time-dependent rock property value at point 530 may be considered an acceptable solution for $F(t_{i+1})$, e.g., if the estimated rock property value at point 530 is within a predetermined error tolerance. However, this approximation may be unable to capture the error between the estimated value and the actual or measured value of the time-dependent property.

In one or more embodiments, the approximation may be improved by incorporating geostatistics, which may be representative of trends in measured or observed values of the time-dependent rock property in the time domain and the space domain. Such an approximation scheme may use, for example, a spatio-temporal variogram describing the variance between values of the time-dependent rock property in both the space and time domains simultaneously, e.g., as expressed using Equation (3):

$$\gamma(x, t) = \frac{1}{2n} \sum [Z(x_i, t_i) - Z(x_j, t_j)]^2, \qquad (3)$$

where x is space, t is time, Z is a random function that is dependent upon time and space simultaneously, i is an index that is related to an observation of the time-dependent rock property value at a fixed location in space (x) and time (t), and j is an index related to a second observation of the time-dependent rock property value at a different location (x+$\Delta$x) and a different time (t+$\Delta$t). The observations of the time-dependent rock property values may be based on seismic data sampled by a seismic tool, e.g., seismic tool 118 of FIGS. 1 and 3, as described above, at different time or sampling intervals.

In one or more embodiments, an optimal linear unbiased prediction of the random function Z for a future sampling interval may be achieved by minimizing the expected mean squared error between the predicted value and the actual value of the time-dependent rock property to be observed at the predicted time and location. In one or more embodiments, a prediction $z(x_0, t_0)$ of the random function for observed values of the time-dependent rock property at a point ($x_0$) in space and a time (t0) may be determined using Equation (4) as follows:

$$z(x_0, t_0) = m_0^T \beta + c_0^T C_n^{-1} (\tilde{z} - M\beta) \qquad (4),$$

where z is a realization of the random function Z, M is a design matrix of predictor variables at the location of an observation of the time-dependent rock property at a first location, $m_0^T$ is a vector of predictors at the first location, $C_n$ is a covariance matrix of the residuals (e.g., the difference between the observed values and the predicted values) at each location corresponding to the sampled seismic data, co is a vector of covariance between the observation and prediction residuals, and $\tilde{z}$ is the vector of observations at locations $z(x_i,t_i)$.

In one or more embodiments, a space-time covariance may be computed according to components in space (s) and time (t) in addition to a combined space-time (st). Such a space-time component may be governed by a space-time or zonal anisotropy ratio for comparing changes in the spatial location of the time-dependent rock within an area of a formation to the elapsed time between sampling intervals. The space-time covariance may be expressed using Equation (5) as follows:

$$C(\Delta x, \Delta t) = C_s(\Delta x) + C_t(\Delta t) + C_{st}(\sqrt{\Delta x^2 + (\alpha \Delta t)^2}) \quad (5),$$

where $\alpha$ corresponds to the zonal anisotropy ratio, which may vary depending on the amount of variation in space to time. The variation in space to time may provide the ratio $\alpha$ unit of velocity. In one or more embodiments, the velocity associated with the zonal anisotropy ratio may correspond to a propagation velocity of the seismic waves sampled by seismic sensors, e.g., sensors 122 of seismic tool 118 of FIGS. 1 and 3, as described above, during a seismic survey of the formation area of interest.

In cases where the zonal anisotropy ratio $\alpha$ in Equation (5) above is determined to be equal to the velocity u in Equation (1), the spatial variability of formation properties corresponding to the change in distance ($\Delta x$) in Equation (5) may be set to the value of $\Delta x$ according to Equation (1), as described above. Likewise, the change in time ($\Delta t$) for Equation (5) may be set to N times the upper bound of the numerical model time increment $\Delta t$ according to Equation (1), where the value of N may be greater than one or the upper bound of the numerical model time increment $\Delta t$ in Equation (1).

In one or more embodiments, the variability of the formation properties in space and time according to Equations (1) and (5) may be captured in a simulation grid of a petro-elastic model for numerical flow simulation, as will be described in further detail below. This may allow predicted rock properties for a future time instance to be co-analyzed effectively with the numerical flow simulation, even in cases where no actual "hard" data exists at the future time.

In one or more embodiments, the above-described spatio-temporal approximation scheme may be modified to estimate the space-time covariance using an autoregression filter, also referred to as a prediction-error filter (PEF). Such a covariance filter may be estimated using, for example, least-squares and an inverse-covariance filter based on a helical coordinate system. Such a coordinate system may also be used to interpolate and extrapolate seismic data or measurements of formation properties in space and time. The covariance filter may be applied in space, time or any combination thereof for any number of dimensions. The modification of the spatio-temporal approximation in this example may involve applying the spatio-temporal approximation to stochastic simulation for estimating or predicting values of the time-dependent rock property at a future instance or interval of time, i.e., $F(t_{i+1})$. Such a modification may therefore provide a third approximation scheme in addition to the linear and spatio-temporal approximation schemes described above. It should be appreciated that any of various well-known techniques, e.g., Sequential Gaussian Simulation, may be used to apply the spatio-temporal (or second) approximation scheme to stochastic simulation.

In one or more embodiments, the estimation of $F(t_{i+1})$ based on stochastic simulation may provide multiple equiprobable realizations of time-dependent rock property values based on at least two observed values of the rock property, e.g., values of the rock property observed from seismic data acquired at a previous time interval and a current time interval. The multiple equiprobable realizations may be used to account for uncertainty in the flow simulation and resulting predictions of the time-dependent rock property values. Sources of uncertainty may include, for example and without limitation, characterization of flow in the subsurface, the petro-elastic relationship between flow and rock properties during production, fluid/rock interaction, geomechanical phenomena, and time shifting in the acquired multi-vintage seismic data.

In some implementations, Gaussian white noise may also be added to the multiple equiprobable realizations of the time-dependent rock property values in order to account for such uncertainty. The Gaussian white noise may include, for example, statistical noise corresponding to recognized amounts of unexplained variations due to one or more of the aforementioned sources of uncertainty. With the addition of the Gaussian white noise, the multiple realizations may be more likely to capture the correct representation of the rock property as it varies over time.

Figure 6:
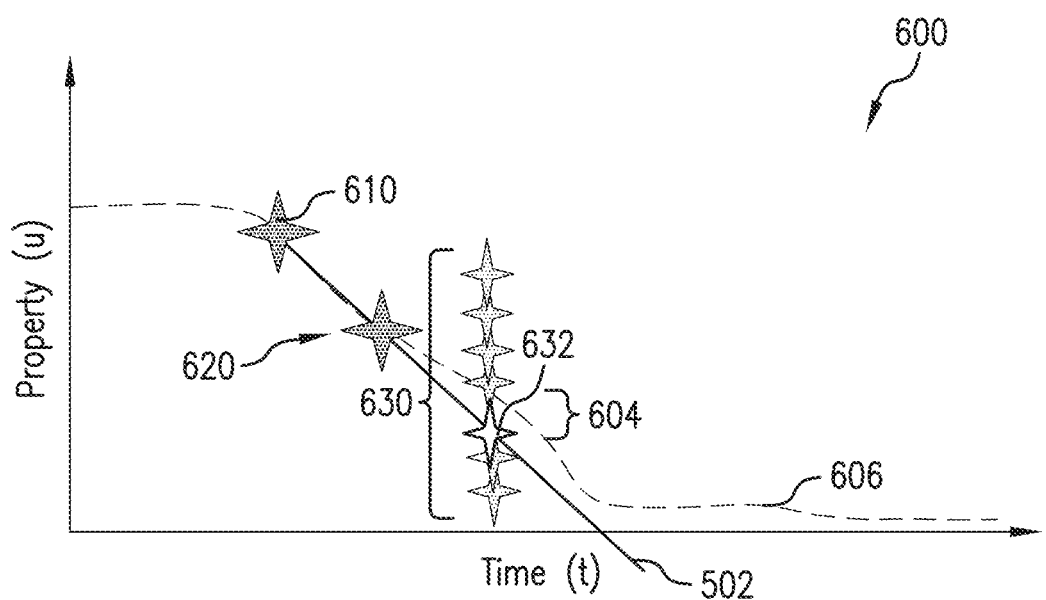
FIG. 6 is a graph of another illustrative profile for a time-dependent rock property at a fixed location within a subsurface formation.

FIG. 6 is a graph 600 illustrating an example of multiple equiprobable realizations of a time-dependent rock property at a fixed location based on observed values that vary between at least two instances or intervals of time, e.g., a current time interval (ti) and a previous time interval ($t_{i-1}$). Similar to graph 500 of FIG. 5, described above, graph 600 includes a solid line representing a profile 602 of the estimated or predicted rock property values over a period of time as well as a dashed line representing a profile 604 of the measured or observed rock property values over the same time period. A point 610 within graph 600 may correspond to an observed value of the rock property at a previous time interval or $F(t_{i-1})$, and a point 620 may correspond to an observed value of the rock property at a current time interval or F(ti).

A shown in FIG. 6, a set of points 630 may correspond to the multiple equiprobable realizations of the time-dependent rock property at a future time interval or $F(t_{i+1})$ based on the observed values at $F(t_{i-1})$ and F(ti). The multiple equiprobable realizations in this example may be determined based on the stochastic simulation of the third approximation scheme, as described above. For the particular location in this example, the realization represented by a point 632 in the set of points 630 may provide the most accurate description of the given rock property at the time $t_{i+1}$.

In one or more embodiments, a fourth approximation scheme may be used for predicting a value of a time-dependent rock property $F(t_{i+1})$ when only the observed value from a previous time interval or $F(t_{i-1})$ exists. In this scheme, $F(t_{i+1})$ may be approximated through a coupled petro-elastic model (PEM). The calibrated results of a flow simulation using the petro-elastic model may replace the missing inverted seismic data at $F(t_i)$ so that the value of the rock property at a future instance of time may be predicted using one or more of the other three approximation schemes described above. As the actual or hard data used in such PEM-based approximation scheme is reduced due to the missing seismic data at $F(t_i)$, there may be greater uncertainty in the resulting prediction. However, an advantage of this approximation scheme is that it allows the prediction of the rock property value in forward time with limited or non-existent time-dependent hard data and without requiring observed data at $F(t_{i-1})$ and $F(t_i)$.

Figure 7:
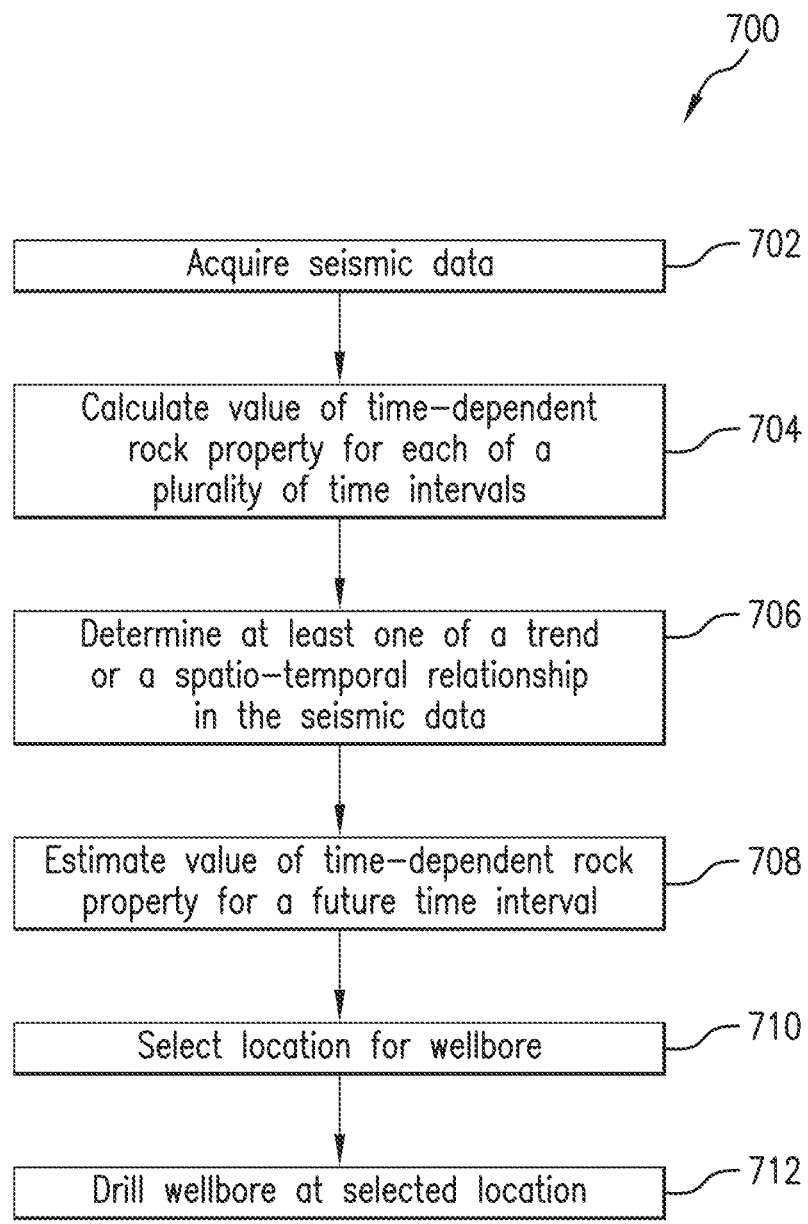
FIG. 7 is a flowchart of an illustrative process for seismic analysis and modeling of a time-dependent rock property of a subsurface formation in forward time.

FIG. 7 is a flowchart of a process 700 for seismic analysis and modeling of at least one time-dependent rock property of a subsurface formation in forward time. For discussion purposes, process 700 will be described with reference to system 300 of FIG. 3, as described above. However, process 700 is not intended to be limited thereto. As shown in FIG. 7, process 700 begins in block 702, which includes acquiring seismic data for a subsurface formation over a plurality of time intervals.

In block 704, a value of at least one rock property of the subsurface formation may be calculated for each of the plurality of time intervals based on the corresponding seismic data acquired for that interval. In one or more embodiments, the calculation in block 704 may include performing an inversion of the acquired seismic data to generate one or more seismic inversion datasets representing the at least one rock property over the plurality of time intervals and then, using the generated seismic inversion datasets to calculate the values of the at least one rock property.

Process 700 then proceeds to block 706, which includes determining at least one of a trend or a spatio-temporal relationship in the seismic data based on the value of the at least one rock property calculated in block 704 for each of the time intervals. In one or more embodiments, the spatio-temporal relationship may be determined using a spatio-temporal variogram based on a random function representing changes in values of the at least one rock property for one or more locations in space and time, as described above.

In block 708, a value of the at least one rock property may be estimated for a future time interval based on the data trend or spatio-temporal relationship determined in block 706.

In block 710, a location for a wellbore to be drilled within the subsurface formation may be selected based on the estimated value of the at least one rock property and the wellbore may be drilled in block 712 at the selected location.

In one or more embodiments, differences between the numerical reservoir model and the acquired multi-vintage seismic rock property data may be qualitatively and quantitatively analyzed using any of the four approximation schemes described above. The results of the analysis may be used to assess the cause of any disparities between simulation results based on the model and the inverted seismic data based on actual measurements from the field, including any disparities resulting from production, model parameterization or inversion processing.

In the examples described above with respect to FIGS. 1-7, it is assumed that the velocity between seismic vintages is accurate enough for the corresponding depth-domain volumes of seismic data to be registered to one another. Any changes in compaction, subsidence, or other structural properties of the formation between seismic vintages may cause shifts in the depth of the time-dependent rock within the formation. In one or more embodiments, cross-correlation or dynamic time-warping (applied in the depth domain) techniques may be used to ensure that such depth shifts are also captured within the seismic volumes, e.g., by appropriately shifting data points along an axis of the volume corresponding to the depth domain.

However, it should be appreciated that these shifts may need to be applied to the seismic data prior to using the disclosed approximation techniques to ensure spatial continuity of data points between the depth-domain seismic volumes. In some implementations, the depth shifts may be modeled as a property and the approximation techniques described above may be used to create extrapolated warping properties. Alternatively, interpolated shifts may be applied to create extrapolated warping solutions that inherently capture the amount of warping over time.

In one or more embodiments, a visualization of the seismic vintages may be displayed in the time domain based on extrapolated seismic attributes created using the above-described techniques. For example, dynamic time-warping or cross-correlation may be used to identify time shifts between different vintages of seismic data, e.g., based on a base and monitor survey or multiple monitor surveys. The time shifts may also be used as an additional property in the corresponding seismic volumes or to warp intermediate volumes. In some implementations, the time-shifted seismic data may be visualized as an animation coupled with production information or data from other sources, e.g., data indicating how much time-domain pull-up or pull-down has occurred or other data that may facilitate seismic interpretation.

Figure 8:
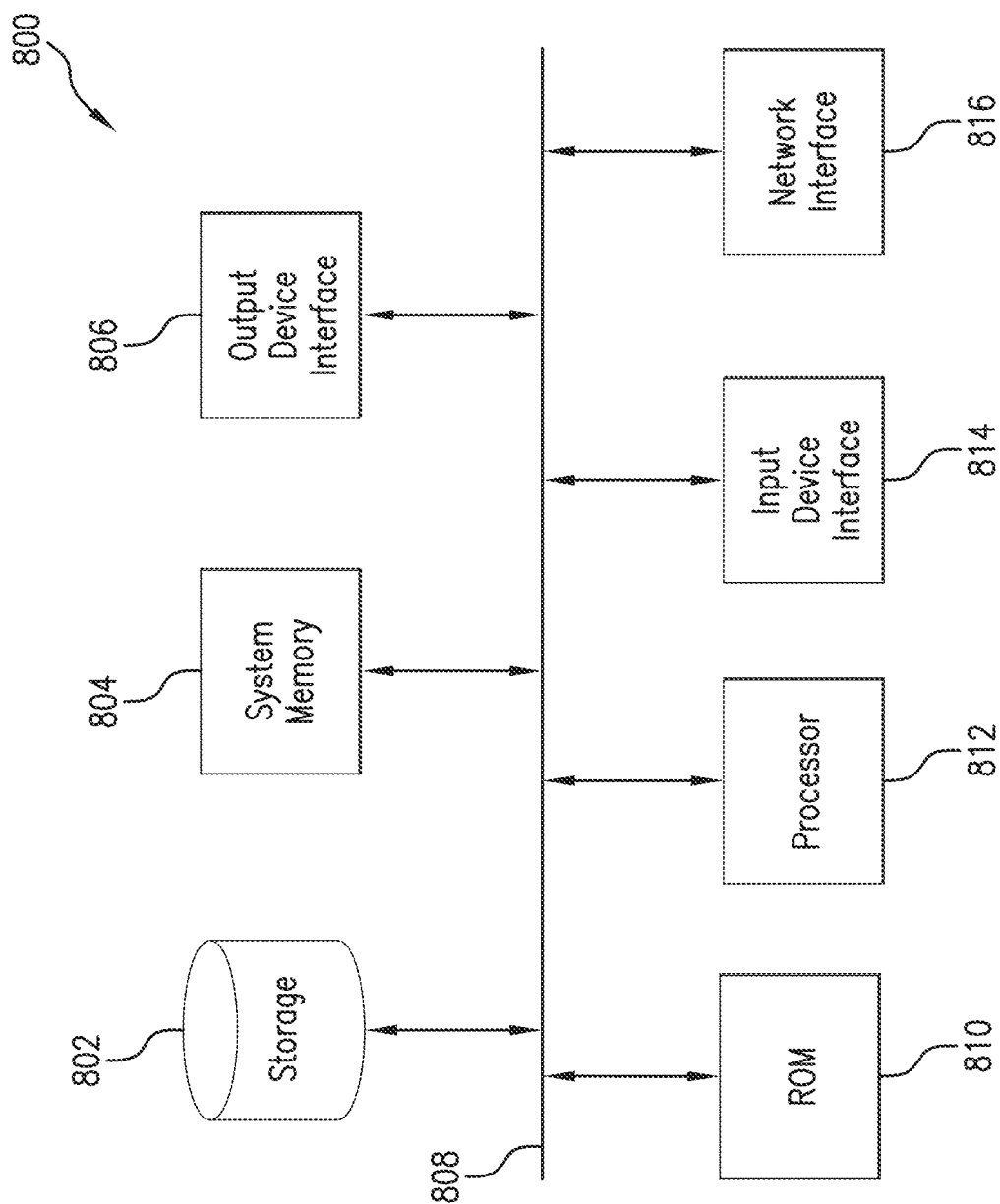
FIG. 8 is a block diagram of an exemplary computer system in which embodiments of the present disclosure may be implemented.

FIG. 8 is a block diagram of an exemplary computer system 800 in which embodiments of the present disclosure may be implemented. For example, computing device 306 of FIG. 3, as described above, may be implemented using system 800. System 800 may also be used to implement various functions for performing process 700 of FIG. 7, as described above. System 800 can be a computer, phone, PDA, or any other type of electronic device. Such an electronic device includes various types of computer readable media and interfaces for various other types of computer readable media. As shown in FIG. 8, system 800 includes a permanent storage device 802, a system memory 804, an output device interface 806, a system communications bus 808, a read-only memory (ROM) 810, processing unit(s) 812, an input device interface 814, and a network interface 816.

Bus 808 collectively represents all system, peripheral, and chipset buses that communicatively connect the numerous internal devices of system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of system 800. Permanent storage device 802, on the other hand, is a read-and-write memory device. This device is a non-volatile memory unit that stores instructions and data even when system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for performing the disclosed seismic analysis and modeling techniques for estimating time-dependent rock property values in future time, in accordance with embodiments of the present disclosure. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the system 800. Input devices used with input device interface 814 include, for example, alphanumeric, QWERTY, or T9 keyboards, microphones, and pointing devices (also called "cursor control devices"). Output device interfaces 806 enables, for example, the display of images generated by the system 800. Output devices used with output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 8, bus 808 also couples system 800 to a public or private network (not shown) or combination of networks through a network interface 816. Such a network may include, for example, a local area network ("LAN"), such as an Intranet, or a wide area network ("WAN"), such as the Internet. Any or all components of system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 700 of FIG. 7, as described above, may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for time-lapse seismic survey feasibility, 4D evaluation of informational studies, and predictive by-pass pay determination. Accordingly, advantages of the present disclosure include, but are not limited to, planning new wells and revising completion strategies based on predicted by-pass pay analysis, time-lapse seismic planning and cost evaluation.

As described above, a computer-implemented method of predicting time-dependent rock properties includes: acquiring seismic data for a subsurface formation over a plurality of time intervals; calculating a value of at least one rock property of the subsurface formation for each of the plurality of time intervals, based on the corresponding seismic data acquired for that time interval; determining at least one of a trend or a spatio-temporal relationship in the seismic data based on the value of the at least one rock property calculated for each of the plurality of time intervals; estimating a value of the at least one rock property for a future time interval, based on the determination; selecting a location for a wellbore to be drilled within the subsurface formation, based on the estimated value of the at least one rock property; and drilling the wellbore at the selected location. Likewise, a computer-readable storage medium has been described, in which instructions are stored, which when executed by a processor cause the processor to perform a plurality of functions, including functions to: acquire seismic data for a subsurface formation over a plurality of time intervals; calculate a value of at least one rock property of the subsurface formation for each of the plurality of time intervals, based on the corresponding seismic data acquired for that time interval; determine at least one of a trend or a spatio-temporal relationship in the seismic data based on the value of the at least one rock property calculated for each of the plurality of time intervals; estimate a value of the at least one rock property for a future time interval, based on the determination; and select a location for a wellbore to be drilled within the subsurface formation, based on the estimated value of the at least one rock property, wherein the wellbore is drilled at the selected location.

In one or more embodiments of the foregoing method or computer-readable storage medium, calculating may comprise: performing an inversion of the acquired seismic data to generate one or more seismic inversion datasets representing the at least one rock property over the plurality of time intervals; and calculating the values of the at least one rock property, based on the generated seismic inversion datasets. Furthermore, determining may comprise: simulating fluid flow within the subsurface formation over the plurality of time intervals, based on the one or more seismic inversion datasets; generating a petro-elastic model of the subsurface formation, based on the simulation; and determining at least one of the trend or the spatio-temporal relationship in the values of the at least one rock property, based on the generated petro-elastic model. Estimating may comprise: generating a set of equiprobable realizations of the at least one rock property for the future time interval; selecting at least one realization from the set of equiprobable realizations, based on the petro-elastic model of the subsurface formation; and estimating the value of the at least one rock property for the future time interval, based on the selected realization. Generating the set of equiprobable realizations may further comprise adding Gaussian white noise to the equiprobable realizations to account for one or more sources of uncertainty. The petro-elastic model of the subsurface formation may be defined by a three-dimensional (3D) grid of cells, and the value of the at least one rock property may be estimated for each cell in the 3D grid of cells corresponding to a 3D volume of the subsurface formation. One or more of the foregoing embodiments may further include: obtaining measurements of an actual value of the at least one rock property at the future time interval; comparing the estimated value of the at least one rock property with the actual value; and updating the petro-elastic model of the subsurface formation, based on the comparison. The spatio-temporal relationship may be determined using a spatio-temporal variogram based on a random function representing changes in values of the at least one rock property for one or more locations in space and time. Comparing may include calculating a covariance between the estimated value of the at least one rock property and the actual value for each of the one or more locations in space and time.

Furthermore, a system has been described, where the system includes at least one processor and a memory coupled to the processor having instructions stored therein, which when executed by the processor, cause the processor to perform a plurality of functions, including is functions to: acquire seismic data for a subsurface formation over a plurality of time intervals; calculate a value of at least one rock property of the subsurface formation for each of the plurality of time intervals, based on the corresponding seismic data acquired for that time interval; determine at least one of a trend or a spatio-temporal relationship in the seismic data based on the value of the at least one rock property calculated for each of the plurality of time intervals; estimate a value of the at least one rock property for a future time interval, based on the determination; and select a location for a wellbore to be drilled within the subsurface formation, based on the estimated value of the at least one rock property, wherein the wellbore is drilled at the selected location.

In one or more embodiments of the foregoing system, the functions performed by the processor may further include functions to: perform an inversion of the acquired seismic data to generate one or more seismic inversion datasets representing the at least one rock property over the plurality of time intervals; calculate the values of the at least one rock property, based on the generated seismic inversion datasets; simulate fluid flow within the subsurface formation over the plurality of time intervals, based on the one or more seismic inversion datasets; generate a petro-elastic model of the subsurface formation, based on the simulation; determine at least one of the trend or the spatio-temporal relationship in the values of the at least one rock property, based on the generated petro-elastic model; generate a set of equiprobable realizations of the at least one rock property for the future time interval; select at least one realization from the set of equiprobable realizations, based on the petro-elastic model of the subsurface formation; estimate the value of the at least one rock property for the future time interval, based on the selected realization; add Gaussian white noise to the equiprobable realizations to account for one or more sources of uncertainty; obtain measurements of an actual value of the at least one rock property at the future time interval;

compare the estimated value of the at least one rock property with the actual value; update the petro-elastic model of the subsurface formation, based on the comparison; and calculate a covariance between the estimated value of the at least one rock property and the actual value for each of the one or more locations in space and time. The petro-elastic model of the subsurface formation may be defined by a three-dimensional (3D) grid of cells, and the value of the at least one rock property may be estimated for each cell in the 3D grid of cells corresponding to a 3D volume of the subsurface formation. The spatio-temporal relationship may be determined using a spatio-temporal variogram based on a random function representing changes in values of the at least one rock property for one or more locations in space and time.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of predicting time-dependent rock properties, the method comprising:
    acquiring, by a computing device, seismic data for a subsurface formation over a plurality of time intervals;
    calculating, by the computing device, a value of at least one rock property of the subsurface formation for each of the plurality of time intervals, based on the corresponding seismic data acquired for that time interval;
    determining, by the computing device, at least one of a trend or a spatio-temporal relationship in the seismic data based on the value of the at least one rock property calculated for each of the plurality of time intervals;
    generating, by the computing device, a set of equiprobable realizations of the at least one rock property for a future time interval;
    estimating, by the computing device, a value of the at least one rock property for the future time interval, based on at least one realization selected from the set of equiprobable realizations; and
    selecting, by the computing device, a location for a wellbore to be drilled within the subsurface formation, based on the estimated value of the at least one rock property, wherein the wellbore is drilled at the selected location.

2. The method of claim 1, wherein calculating comprises:
    performing an inversion of the acquired seismic data to generate one or more seismic inversion datasets representing the at least one rock property over the plurality of time intervals; and
    calculating the values of the at least one rock property, based on the generated seismic inversion datasets.

3. The method of claim 2, wherein determining comprises:
    simulating fluid flow within the subsurface formation over the plurality of time intervals, based on the one or more seismic inversion datasets;
    generating a petro-elastic model of the subsurface formation, based on the simulation; and
    determining at least one of the trend or the spatio-temporal relationship in the values of the at least one rock property, based on the generated petro-elastic model.

4. The method of claim 3, wherein estimating comprises:
    selecting the at least one realization from the set of equiprobable realizations, based on the petro-elastic model of the subsurface formation; and
    estimating the value of the at least one rock property for the future time interval, based on the selected realization.

5. The method of claim 4, wherein generating the set of equiprobable realizations further comprises: adding Gaussian white noise to the equiprobable realizations to account for one or more sources of uncertainty.

6. The method of claim 4, wherein the petro-elastic model of the subsurface formation is defined by a three-dimensional (3D) grid of cells, and the value of the at least one rock property is estimated for each cell in the 3D grid of cells corresponding to a 3D volume of the subsurface formation.

7. The method of claim 3, further comprising:
obtaining measurements of an actual value of the at least one rock property at the future time interval;
comparing the estimated value of the at least one rock property with the actual value; and
updating the petro-elastic model of the subsurface formation, based on the comparison.

8. The method of claim 7, wherein the spatio-temporal relationship is determined using a spatio-temporal variogram based on a random function representing changes in values of the at least one rock property for one or more locations in space and time.

9. The method of claim 8, wherein comparing comprises:
calculating a covariance between the estimated value of the at least one rock property and the actual value for each of the one or more locations in space and time.

10. A system comprising:
at least one processor; and
a memory coupled to the processor having instructions stored therein, which when executed by the processor, cause the processor to perform a plurality of functions, including functions to:
acquire seismic data for a subsurface formation over a plurality of time intervals;
calculate a value of at least one rock property of the subsurface formation for each of the plurality of time intervals, based on the corresponding seismic data acquired for that time interval;
determine at least one of a trend or a spatio-temporal relationship in the seismic data based on the value of the at least one rock property calculated for each of the plurality of time intervals;
generate a set of equiprobable realizations of the at least one rock property for a future time interval;
estimate a value of the at least one rock property for the future time interval, based on at least one realization selected from the set of equiprobable realizations; and
select a location for a wellbore to be drilled within the subsurface formation, based on the estimated value of the at least one rock property, wherein the wellbore is drilled at the selected location.

11. The system of claim 10, wherein the functions performed by the processor include functions to:
perform an inversion of the acquired seismic data to generate one or more seismic inversion datasets representing the at least one rock property over the plurality of time intervals; and
calculate the values of the at least one rock property, based on the generated seismic inversion datasets.

12. The system of claim 11, wherein the functions performed by the processor include functions to:
simulate fluid flow within the subsurface formation over the plurality of time intervals, based on the one or more seismic inversion datasets;
generate a petro-elastic model of the subsurface formation, based on the simulation; and
determine at least one of the trend or the spatio-temporal relationship in the values of the at least one rock property, based on the generated petro-elastic model.

13. The system of claim 12, wherein the functions performed by the processor include functions to:
select the at least one realization from the set of equiprobable realizations, based on the petro-elastic model of the subsurface formation; and
estimate the value of the at least one rock property for the future time interval, based on the selected realization.

14. The system of claim 13, wherein the functions performed by the processor include functions to add Gaussian white noise to the equiprobable realizations to account for one or more sources of uncertainty.

15. The system of claim 13, wherein the petro-elastic model of the subsurface formation is defined by a three-dimensional (3D) grid of cells, and the value of the at least one rock property is estimated for each cell in the 3D grid of cells corresponding to a 3D volume of the subsurface formation.

16. The system of claim 12, wherein the functions performed by the processor include functions to:
obtain measurements of an actual value of the at least one rock property at the future time interval;
compare the estimated value of the at least one rock property with the actual value; and
update the petro-elastic model of the subsurface formation, based on the comparison.

17. The system of claim 16, wherein the spatio-temporal relationship is determined using a spatio-temporal variogram based on a random function representing changes in values of the at least one rock property for one or more locations in space and time.

18. The system of claim 17, wherein the functions performed by the processor include functions to calculate a covariance between the estimated value of the at least one rock property and the actual value for each of the one or more locations in space and time.

19. A non-transitory computer-readable storage medium having instructions stored therein, which when executed by a processor cause the processor to perform a plurality of functions, including functions to:
acquire seismic data for a subsurface formation over a plurality of time intervals;
calculate a value of at least one rock property of the subsurface formation for each of the plurality of time intervals, based on the corresponding seismic data acquired for that time interval;
determine at least one of a trend or a spatio-temporal relationship in the seismic data based on the value of the at least one rock property calculated for each of the plurality of time intervals;
generate a set of equiprobable realizations of the at least one rock property for a future time interval;
estimate a value of the at least one rock property for the future time interval, based on at least one realization selected from the set of equiprobable realizations; and
select a location for a wellbore to be drilled within the subsurface formation, based on the estimated value of the at least one rock property, wherein the wellbore is drilled at the selected location.

20. The non-transitory computer-readable storage medium of claim 19, wherein the functions performed by the processor include functions to:

perform an inversion of the acquired seismic data to generate one or more seismic inversion datasets representing the at least one rock property over the plurality of time intervals; and calculate the values of the at least one rock property, based on the generated seismic inversion datasets.

* * * * *